J. A. MASHMEYER.
Buckles.
No. 5,411.
Reissued May 13, 1873.
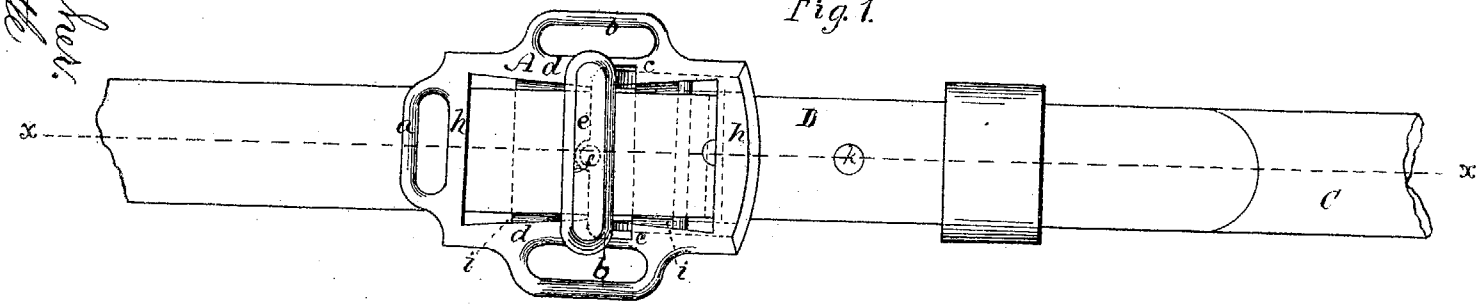
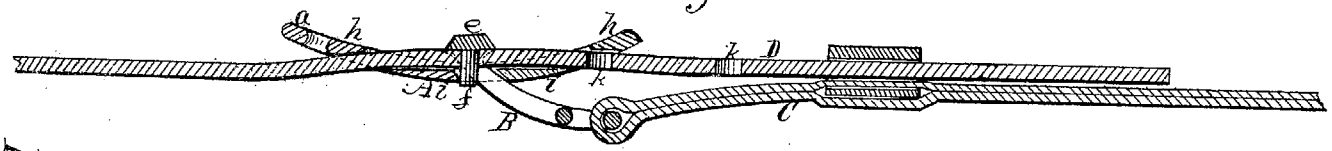
Attest:
E. M. Gallaher.
Geo. Barth
Inventor:
John A. Mashmeyer,
By his atty.
J. S. Brown.
AM. PHOTO-LITHOGRAPHIC CO. N.Y. (OSBORNE'S PROCESS.)

UNITED STATES PATENT OFFICE.

JOHN A. MASHMEYER, OF BEARDSTOWN, ILLINOIS, ASSIGNOR TO SAMUEL S. SARGEANT, OF NEWARK, N. J.

IMPROVEMENT IN BUCKLES.

Specification forming part of Letters Patent No. 77,064, dated April 21, 1868; reissue No. 5,411, dated May 13, 1873; application filed December 5, 1872.

*To all whom it may concern:*

Be it known that I, JOHN A. MASHMEYER, of Beardstown, in the county of Cass and State of Illinois, have invented an Improved Harness-Buckle; and I do hereby declare that the following is a full and exact description thereof, reference being had to the accompanying drawing making part of this specification—

Figure 1 being an outer or top view of the buckle as applied to a harness trace and tug; Fig. 2 a longitudinal section of the same in a plane indicated by the line *x x*, Fig. 1.

Like letters designate corresponding parts in both figures.

The buckle is composed of two parts, the frame A and the bow or bail B attached to the tug C. As a trace-buckle it has the usual loops *a b b* on the frame A. The trace or strap D passes between the end bars *h h* of the frame, and one or more intermediate cross-bars *i i* placed in such positions in relation to the said end bars by curving the sides of the frame or otherwise, that the trace remains straight or nearly so in the buckle. The bow or bail B extends upward or outward through the frame A, its sides moving in notches *c c* in the inner edges of the sides *d d;* and the end or cross-bar *e* of the said bow or bail is extended so as to prevent the bail from drawing through the frame when the trace is removed, so that the parts of the buckle cannot be accidentally separated, and are kept in proper relative positions at all times. This cross-bar *e* presses upon the upper or outer surface of the trace near the cross-bars *i i* of the frame, and by the compression of the trace thus produced, increasing with the force of the draft, relieves the tongue *f* of the buckle from undue strain and from tearing the trace at the holes. The tongue, as represented in the drawing, projects from the cross-bar *e* of the bow or bail B. The trace is detached or shifted in position by raising the bar B till the tongue *f* is withdrawn, when the trace is free to move in the frame. The buckle may be finished in any usual style, such as by plating or japanning; and may be ornamented in any desired manner. It is strong and durable, and does not bend nor wear the trace. It may be applied to other uses besides that for harness-traces.

What I claim as my invention, and desire to secure by Letters Patent, is—

1. In a harness or other buckle composed of a frame, a bail or bow and a tongue, the arrangement, as described, of the bail or bow B in combination with the frame A to both slide therein and loop around the trace or strap over an opening in the said frame, substantially as herein specified.

2. A harness or other buckle composed of a frame, A, and a bail or bow, B, sliding therein and having a tongue on the cross-bar *e*, that draws or presses on the trace or strap over an opening in the frame, substantially as herein specified.

3. In a harness or other buckle composed of an open frame and a bail or bow sliding in the same, the outward lateral projections on the bail or bow to prevent its sliding through the frame, substantially as herein specified.

Specification signed by me this 15th day of November, 1872.

JOHN A. MASHMEYER.

Witnesses:

THEO. WILKINS,
HENRY MENKE, Jr.